United States Patent [19]
Hitosugi

[11] 3,811,809
[45] May 21, 1974

[54] DIE PRESS AND ADJUSTING MECHANISM THEREFOR

[76] Inventor: Takeo Hitosugi, No. 1-20-7, Taihei-cho, Tokyo, Japan

[22] Filed: Mar. 16, 1973

[21] Appl. No.: 342,200

Related U.S. Application Data

[63] Continuation-in-part of Ser. No. 100,695, Dec. 22, 1970.

[52] U.S. Cl................. 425/173, 425/247, 425/444
[51] Int. Cl.............................................. B28b 17/00
[58] Field of Search .......... 425/173, 190, 191, 192, 425/242, 247, 409, 139, 436, 444; 100/DIG. 18

[56] References Cited
UNITED STATES PATENTS
3,209,407   10/1965   Reis ................................. 425/247
3,505,708   4/1970    Moslo ............................... 425/444

FOREIGN PATENTS OR APPLICATIONS
990,016   4/1965   Great Britain ............... 100/DIG. 18
1,516,969   2/1968   France ....................... 100/DIG. 18

Primary Examiner—Robert L. Spicer, Jr.
Attorney, Agent, or Firm—Steinberg & Blake

[57] ABSTRACT

A die press such as an injection molding press. The press has a lower table and an upper bolster for respectively carrying lower and upper die structures which will define a cavity to receive the mold material. An injection assembly is situated at the upper bolster for injecting mold material into this cavity. The bolster is capable of being swung between an operative position over the table and an inspection position where the bolster has been swung from its operative position through 180° and is inverted so that the upper die structure can readily be inspected. A mounting structure mounts the injection assembly on the bolster in such a way that it is possible for the injection assembly to swing with the bolster while still remaining operative at all times.

3 Claims, 5 Drawing Figures

FIG. 4
FIG. 5
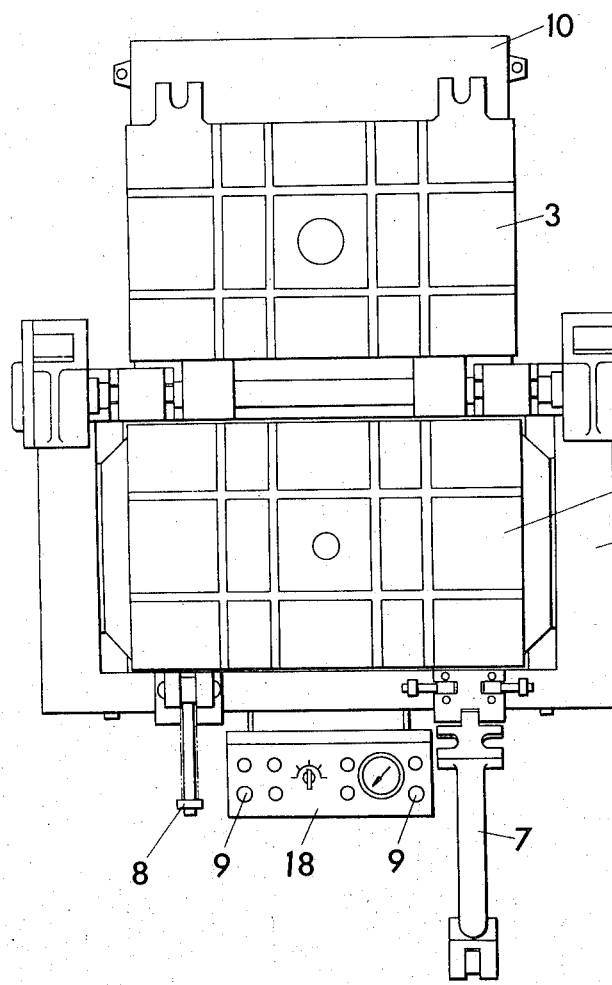
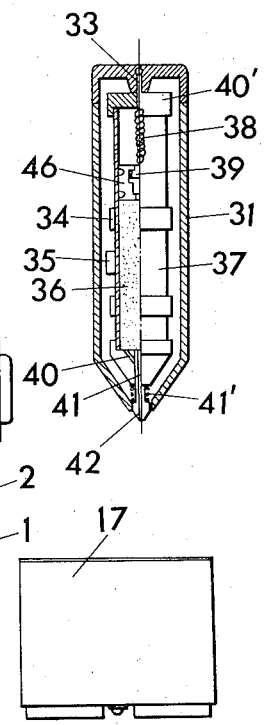

DIE PRESS AND ADJUSTING MECHANISM THEREFOR

CROSS REFERENCE TO RELATED APPLICATION

This application is a continuation-in-part of co-pending application Ser. No. 100,695, now abandoned, filed Dec. 22, 1970 and entitled Trial Die Spotting Press of Full Open Type.

BACKGROUND OF THE INVENTION

The present invention relates to die presses.

The present invention relates particularly to injection molding presses.

When setting a press of this type up for operation it is necessary to adjust the cooperating upper and lower die structures very carefully so that they will be positioned very accurately with respect to each other to enable the desired articles to be injection molded. During such setting up operations very careful adjustments of the dies are essential, and considerable inconvenience is encountered in making the required adjustments because of difficulty and inconvenience of access to the dies which are situated one above the other. Thus, it is conventional, during the setting up period, to inject a material such as wax, for example, into the mold cavities, after which the dies are separated, and the molded article, after it has set, is inspected. For example, during the setting up period, the injected wax is permitted to set and is then inspected. Normally several adjustments of the dies will be required until they are properly positioned. These adjustments require not only repositioning of the dies but also such operations as drilling, tapping, reaming, and the like. Therefore, when access must be had to the upper die structure from beneath the latter, considerable inconveniences are involved, and it is not uncommon to remove the dies and replace them, causing considerable labor and time to be consumed before a final proper set-up is achieved.

It has, therefore, already been proposed to provide a die press of the above general type with an upper bolster which can be swung from an operative position over the table to inspection position where the upper bolster is inverted so that the upper die structure can be inspected in a very convenient manner, and of course operations of the above type can then be carried out very conveniently on both the upper and the lower die structure while they remain fixed respectively to the bolster and table.

However, when a structure of this latter type is used with injection molding, problems are encountered with respect to the injection assembly. Normally the structure for injecting the mold material will be situated at the upper bolster so that the material can be injected downwardly into the mold cavity. Where the upper bolster is however, of the above type where it can be swung from an operative position to an inspection position where the upper bolster is inverted, the injection structure must move also, and at this point considerable problems have been encountered.

Thus, the injection structure will normally contain an amount of mold material in molten condition to be injected into the mold cavity. Because such a structure would have to be inverted with the bolster if the latter is inverted and then again placed in an upright position when the bolster is returned to its operative position, there has not been up to the present time any satisfactory solution to the problem of providing an injection molding press with the conveniences inherent in a bolster which can be swung from a normal operative position over the table to an inspection position where it is inverted.

SUMMARY OF THE INVENTION

It is accordingly a primary object of the present invention to provide a press which will avoid the above drawbacks.

In particular, it is an object of the present invention to provide an injection molding press which can have a bolster which can be swung from a normal operative position to an inverted inspection position without in any way creating any difficulties with respect to the injection of the mold material.

Moreover, it is an object of the present invention to provide a structure of this type which not only can accommodate the injection unit without difficulty, but which in addition will permit adjustments of the injection unit to be carried out so that the best possible injection molding operation can be achieved even though the bolster together with the injection unit are capable of being inverted for the purposes of inspection during setting up of the press.

In addition, it is an object of the invention to provide a press of the above general type with further conveniences such as the capability of very conveniently adjusting the lower die structure which is carried by the table and inspecting the molded article or a wax replica thereof during the setting up period.

According to the invention the injection molding press has a lower table means and an upper bolster means which is normally situated in an operative position over the lower table means. The lower table means carries a lower die structure while the upper bolster means carries an upper die structure which cooperates with the lower die structure to define therewith a mold cavity in which the mold material is injected. A turning means is operatively connected with the upper bolster means for turning the latter around a horizontal axis from the normal operative position over the table means to an inspection position where the upper bolster means is displaced through 180° around the horizontal axis from its operative position with the upper bolster means being inverted, when it is in its inspection position, so that in this way both of the die structures will be directed upwardly and capable of being easily inspected, adjusted, or otherwise worked on as required. A mounting means according to the present invention mounts the injection means on the upper bolster means in such a way that the injection means not only turns with the upper bolster means but at the same time the injection means is maintained by the mounting means in a condition according to which the injection means remains fully operative at all times even though the injection means is displaced between inverted and upright positions, particularly during the setting up period.

BRIEF DESCRIPTION OF DRAWINGS

The invention is illustrated by way of example in the accompanying drawings which form part of this application and in which:

FIG. 4 is a top plan view of the press showing the bolster in its inverted inspection position; and FIG. 5 is a vertical partly sectional elevation of an injection means and part of the mounting means which supports the injection means.

DESCRIPTION OF PREFERRED EMBODIMENTS

Figure 2:
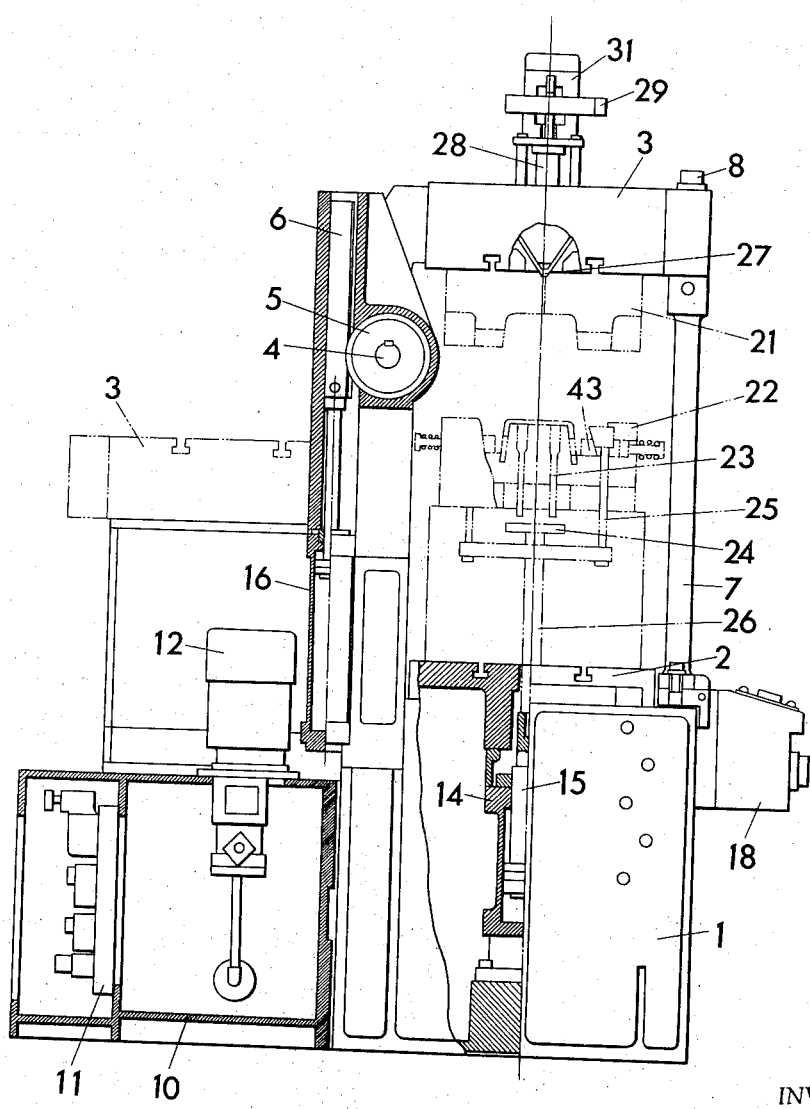
FIG. 2 is a side elevation of the structure of FIG. 1, as seen from the left side of the latter, with the structure of FIG. 2 which is at the left of the center line also being shown in section.
Figure 3:
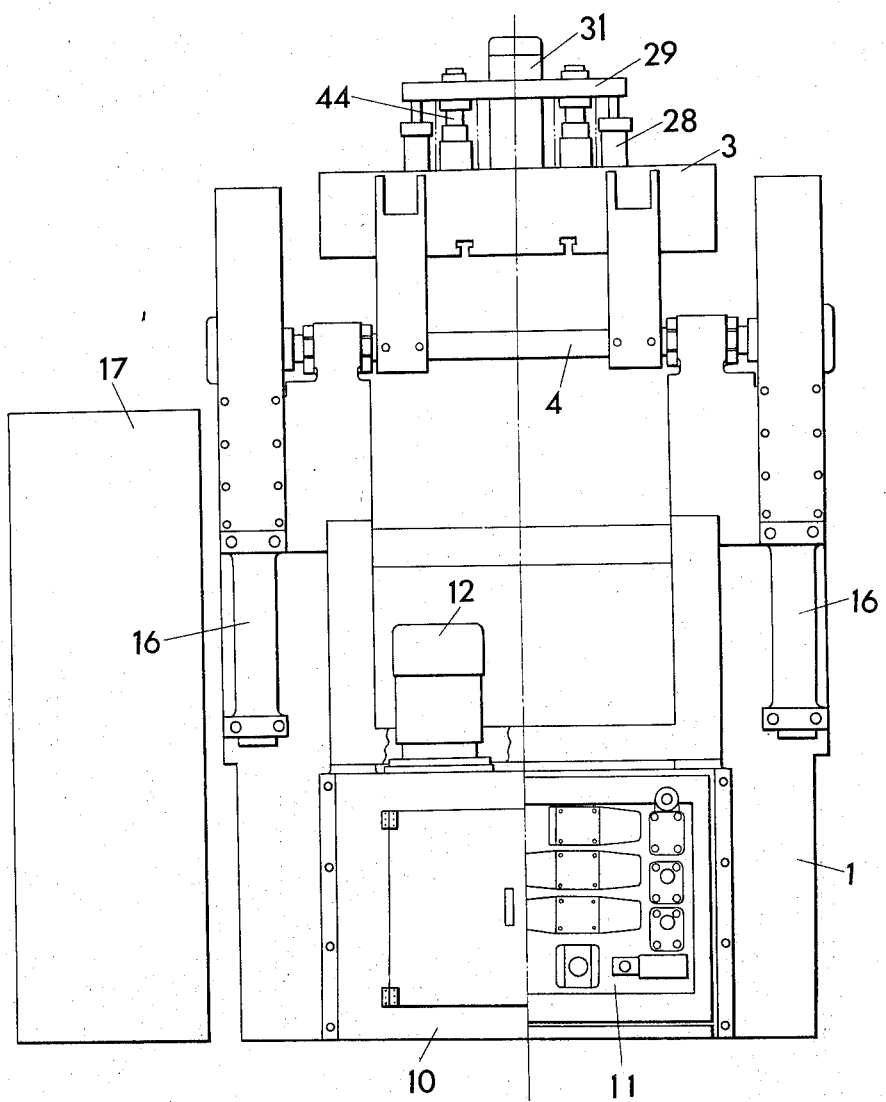
FIG. 3 is a rear elevation of the structure of FIGS. 1 and 2, as seen from the left of FIG. 2, with only part of a pressure control unit being shown at the lower part of FIG. 3 at the right of the center line indicated therein.

Referring now to the drawings, the press illustrated therein includes a machine frame or bed 1. This frame supports for swinging movement a pair of releasable fixing bars 7 which are used to fix the bolster 3 when the latter is in its operative position. Thus, the bars 7 may be swung in a clockwise direction from the vertical positions thereof shown in FIG. 2. FIG. 2 also illustrates part of the supporting bed or frame 1 which carries for rotary movement, in suitable bearings, a rotary shaft 4 which forms part of a turning means operatively connected with the upper bolster means 3 for turning the latter around the horizontal axis of the shaft 4. At its end which is distant from the shaft 4, the substantially rectangular bolster 3 is provided with a pair of notched projections which will receive the upper ends of the bars 7, these upper ends carrying the nuts 8 which are turned for fixing the bolster 3 in the position shown in solid lines in FIG. 2. If desired the nuts 8 may be in the form of thumbscrews.

The rotary shaft 4 to which the upper bolster means 3 is fixed also fixedly carries a pair of pinions 5 which respectively mesh with a pair of vertically movable racks 6 which are coupled with the hydraulic cylinders 16 to which oil under pressure is fed for the purpose of moving the racks 6 downwardly from the position shown in FIG. 2 in order to displace the bolster means 3 from the solid line operative position over the table means 2 into the inverted inspection position shown in dot-dash lines in FIG. 2. To return the bolster means 3 from the inverted position shown in FIG. 2 into the operative position shown at the upper right of FIG. 2 the racks 6 are displaced upwardly by the fluid-pressure means 16.

In this way the bolster means 3 is turned about a horizontal axis through 180° between the operative and inspection positions indicated in FIG. 2. The bolster means 3 serves to carry the upper die structure 21 while the frame or bed 1 carries a lower table means 2 on which the lower die structure 22 is mounted, these upper and lower die structures 21 and 22 cooperating with each other to define a mold cavity which will receive the mold material in a well known manner. At its side which is opposite from the upper die structure 21, which is to say the upper side of the bolster means 3 when the latter is in its operative position shown at the upper right of FIG. 2, the bolster means 3 accommodates an injection means which in turn is operatively connected with the bolster means 3 through a mounting means which includes the hollow casing 31 part of which is visible in FIG. 2 projecting above the bolster means 3. This mounting means includes in addition to the hollow casing 31 a horizontally extending bar 29 which is fixed to and carries the casing 31 and which is situated over the bolster means 3 when the latter is in its normal operative position shown in solid lines at the upper right of FIG. 2.

As may be seen from FIG. 5, the hollow casing 31 of the mounting means accommodates in its interior an injection cylinder 37 in which the mold material 36 is located. The horizontal bar 29 is fixed at the region of its opposite ends to piston rods which project from a pair of pistons situated in a pair of air cylinders 28 which are carried by the bolster means 3 in the manner shown most clearly in FIGS. 1 and 2. Thus, these components 28 and 29 as well as the casing 31 form part of the mounting means for mounting the injection means 37. The bar 29 is formed on opposite sides of the casing 31 with a pair of openings through which a pair of bolts 44 respectively extend, these bolts being fixed to the upper surface of the bolster means 3, as viewed in FIG. 1. At their upper ends which project upwardly beyond the bar 29 the bolts 44 respectively carry the nuts 30, and a pair of springs 32 are respectively coiled around the bolts 44 in order to press the bar 29 against the nuts 30.

As is shown at the lower portion of FIG. 5, the injection means includes a discharge nozzle 42 through which the mold material is discharged, and the nozzle 42 of the injection means is fixed to the casing 31 in the manner shown at the lower part of FIG. 5. This nozzle 42 is required to have a predetermined clearance with respect to the opening 27 of the bolster means 3, this opening 27 being shown in FIG. 2, so that with this clearance properly adjusted the injected material can flow properly into the mold cavity. Thus, by way of the nuts 30 it is possible to achieve a very precise adjustment of the clearance at the opening 27. For this purpose the nuts 30 are turned while the springs 32 maintain the bar 29 against the nuts 30 and while the bar 29 is guided by the bolts 44. At the same time the pressure in the air cylinders 28 assures the fact that the bar 29 will be reliably maintained against the nuts 30. The bar 29 carries at its upper surface a pair of stop members 45 which are turned respectively into engagement with the nuts 30 after the latter are adjusted so as to maintain the nuts 30 in their adjusted positions. Therefore, with this construction even though the injection means 37, 42 is necessarily displaced between inverted and upright positions during turning of the bolster means 3 between its operative and inspection positions, the properly adjusted position of the injection means with respect to the upper bolster means is reliably maintained.

As may be seen from FIG. 5, the outer casing 31 accommodates the injection cylinder 37 in the interior of the casing 31 with a certain clearance which defines a thermally insulating air space. The injection cylinder 37 will be provided with the charge of mold material 36 which may simply be wax during the setting up period. The cylinder 37 is surrounded by an electrical heating element 35 as well as a bimetallic strip 34 which serves to control the temperature to which the charge 36 is heated. The injection means further includes the piston 46 within the cylinder 37, this piston 46 being connected by a chain 38 to the upper end 40' of the cylinder 37 so that when this upper end 40' is removed the chain will serve also to remove the piston 46 so that a new charge can conveniently be situated in the cylinder 37. The top end of the casing 31 is provided with a removable cover formed with a passage 33, which continues through the cap 40' of the cylinder 37 so that air under pressure, for example, can be delivered in this way to the upper side of the piston 46 to act on the latter for discharging the mold material 36 through the discharge nozzle 42. This discharge nozzle 42 is formed with a discharge passage 41, and the tapered bottom end of the cylinder 37 may have an additional passage 40 as illustrated at the lower part of FIG. 5. This tapered bottom end of the cylinder 37 is slidable with respect to the nozzle 42 which is fixed to the bottom end of the casing 31 in an opening thereof. A spring 41' is coiled around the nozzle 42 in the interior lower portion of the casing 31, pressing against an upwardly directed shoulder of the nozzle 42 and the lower end of the cylinder 37 so as to urge the latter upwardly. In this way the top end 40' of the cylinder 37 is continuously pressed against the top end of the casing 31. The top end of the casing 31 is provided with a boss against which the top end 40' of the cylinder 37 is pressed, so that in this way the position of the injection means within the casing 31 is reliably maintained while at the same time the casing 31 can be adjusted as described above to position the nozzle 42 properly, and in addition all of these parts are capable of swinging with the bolster means 3 while at the same time the above-described mounting means will serve to maintain the injection means in a fully operative condition at all times even though this injection means is displaced between inverted and upright positions.

As was indicated above, the press has a lower table means 2 which carries the lower die structure 22. As is shown partly in FIG. 1, the press has the hydraulic cylinder assemblies 13 supported on the bed 1 and carrying the table means 2 so that the latter can be elevated and lowered. In this way it is possible to separate and bring together the die structures 21 and 22. Moreover, the table means 2 carries at a central location a cylinder 14 in which a hydraulic ram 15 is accommodated, this ram 15 being coupled to a rod 26 which is fixed with a cross bar 52 carrying a pair of vertical rods 25 which together with the cams 49 form part of a releasable lock means. As is most clearly shown in FIG. 2, the cams 49 have inclined surfaces for engaging corresponding inclined surfaces on horizontally shiftable lock members 43 which have extensions respectively surrounded by springs 50 situated between enlarged ends of these extensions and the die structure 22. The die structure 22 itself has components formed with openings to receive the lock members 43 when the cams 49 are displaced downwardly, while when the ram 15 is moved upwardly, the releasable lock structure will assume a release position according to which the cams 49 will be displaced upwardly so that the springs 50 can retract the lock members 43 out of openings of the die structure 22. A suitable pressure adjusting valve for controlling the pressure in the oil cylinder 14 can be used to adjust the vertical movement of the cams 49, and this structure is very convenient during setting up operations when the lower die structure 22 can be released, reset and relocked in an adjusted position.

Moreover, the ram 15 is capable of actuating a knockout means which includes the knockout members 23 and the plate 24 at the top end of the rod 26. In this way when the rod 26 moves up with the ram 15 the releasable lock means will release the die structure and the knockout means will move a molded article out of the die so that it can be inspected.

Thus, after a trial product has been removed in the above manner it is possible to raise the table 2 so that the lower die structure 22 can conveniently be inspected and adjusted at the same elevation as the upper die structure 21 after the latter has been inverted together with the bolster means 3 and the injection means and mounting means carried thereby with the parts being in the inspection at this time. Thus, at this time it is extremely convenient to carry out such operations as drilling and assembling die components with radial boring machines, and in addition operations such as threading, reaming, and the like can be carried out.

Figure 1:
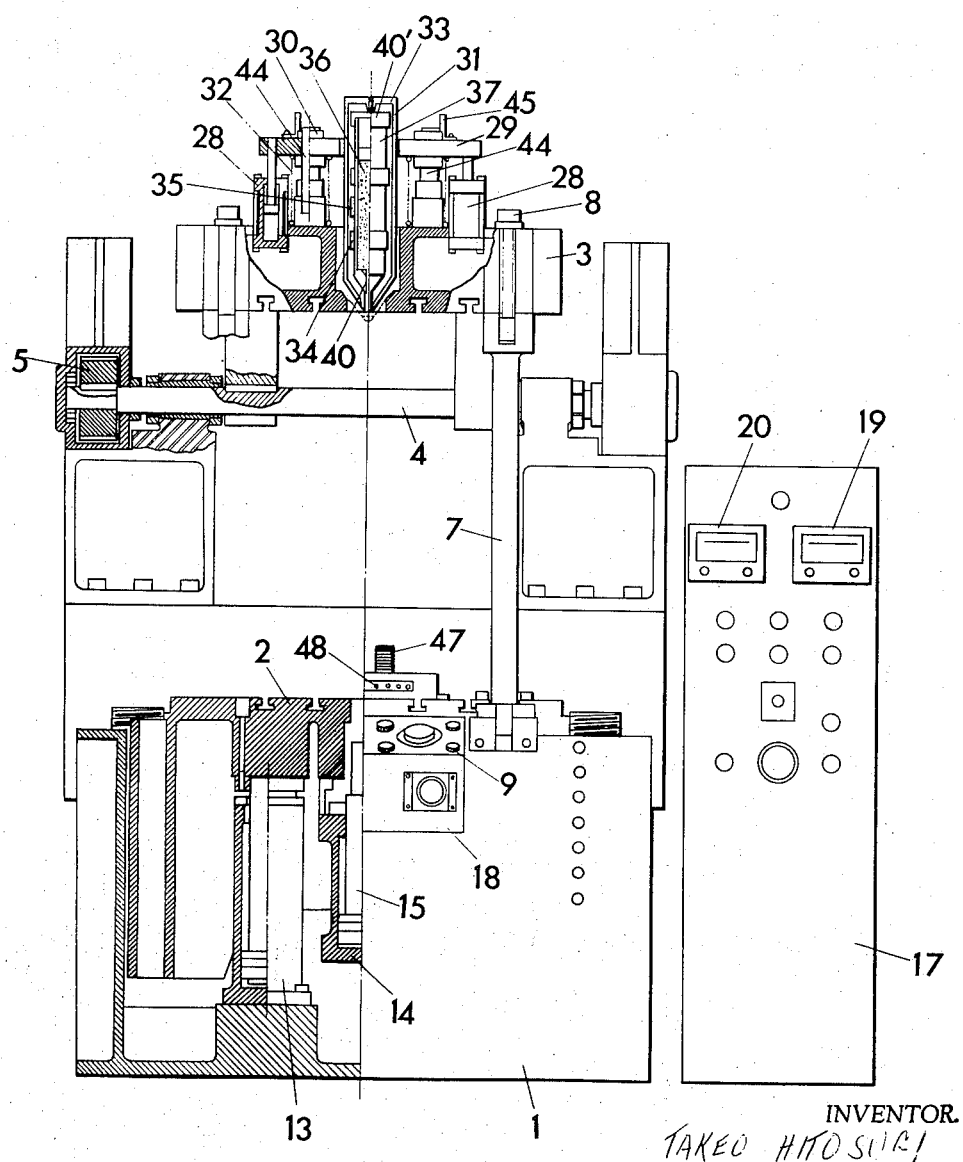
FIG. 1 is a front elevation of a press according to the invention, the structure at the left of the center line extending vertically in FIG. 1 being shown in section.

Operations of the type referred to above together with the heat controlling operations can be carried out from an operating panel 18 provided with suitable push buttons or the like to carry out the required movement of the various components. In addition there is heat-controlling panel 17 situated beyond the bed 1 and having suitable controls. As is shown at the lower left part of FIG. 2, the oil which is used for all of the hydraulic components is situated in a tank 10 while a motor 12 operates a pump and pressure regulation is carried out by the unit 11 for providing the required operations automatically in response to operation of push buttons 9 which are shown in FIG. 4. Thus, the oil tank 10 will contain the oil used to drive the pistons in the cylinders 13, 14, and 16. The pressure unit 11 will control the pressure and the direction of movement of the components. The unit 17 is provided with the temperature-indicating and controlling units 19 and 20 (FIG. 1). These temperature controls may be used for controlling the temperatures of the upper and lower die structures 21 and 22.

Thus, when using the press described above it is possible simply by loosening the nuts 8 and swinging the bars 7 downwardly to have access to the front and both sides of the space in which the dies are situated. In this way part of the adjusting operations can be carried out. The lower die structure 22 is situated at the central part of the table means 2 and in the case where the lower die structure 22 is composed of a multiplicity of die components which can be divided, the dies will have windows or openings into which the lock elements 49 can be introduced by the above-described operation of the ram 15.

After the lower die structure 22 has been set, the upper die structure 21 is connected with the bolster means 3 and the clearance between the nozzle 42 and the opening 27 is adjusted in the manner described above.

During normal operation the bars 7 will be in an upright position determining the distance between the end of the bolster means 3 distant from the shaft 4 and the lower table means 2. This lower table means 2 can be driven upwardly by pressure within the cylinder 13 so that the lower die structure 22 comes into contact with the upper die structure 21, with a rack 47 (FIG. 1) on the table 2 being actuated to show through an indicator 48 the adjustment of the components which may be further regulated by actuation of the buttons 9 on the panel 18. The wax charge 36 used during the setting up operations is heated and injected through the nozzle 42 into the mold cavity. After elapse of a predetermined cooling period, the lower die structure is separated from the upper die structure and the trial product is knocked out by upward movement of the element 24 and the knockout members 23. At this time the bolster means 3 is turned through 180° to the inverted inspection position, and the table 2 will be raised so as to bring the upper surface of the lower die structure 22 up to the same elevation as the upper surface of the inverted upper die structure 21. In this way convenient inspection of both of the die structures and necessary resetting can be carried out. After such resetting operations are completed, the bolster means 3 is returned to its operative position and the above operations are repeated until perfect positioning of the components has been achieved.

Thus it becomes possible with the structure of the invention to achieve in a highly convenient manner precise accurate positioning of the die structures while at the same time it is possible to utilize injection molding with a bolster means which can be turned through 180° between its operative and inspection positions.

What is claimed is:

1. In an injection molding press, lower table means for carrying a lower die structure and upper bolster means normally located over said lower table means for carrying an upper die structure which cooperates with the lower die structure to define a mold cavity, turning means operatively connected with said upper bolster means for turning the latter around a horizontal axis between an operative position located over said lower table means and an inspection position displaced by approximately 180° which respect to said operative position with said upper bolster means having in its inspection position an attitude which is inverted as compared with its attitude when in said operative position, so that both of said die structure will have their cooperating portions directed upwardly for convenient inspection when said bolster means is in said inspection position thereof, injection means situated at said upper bolster means for injecting a mold material into the cavity defined between the upper and lower die structure, and mounting means situated at a side of the said bolster means opposite from said upper die structure and operatively connected with said upper bolster means and said injection means for mounting the latter on said upper bolster means for movement therewith between said operative and inspection portions while maintaining said injection means in an operative condition while said injection means turns with said bolster means between said positions thereof, said injection means including an injection cylinder for containing mold material, a discharge nozzle communicating with said cylinder and through which mold material is discharged out of said cylinder, and a piston in said cylinder to displace mold material out of the latter through said discharge nozzle, said mounting means being operatively connected with said cylinder and nozzle of said injection means for maintaining the latter at a predetermined position with respect to said upper bolster means, said mounting means including an outer casing in which said injection cylinder is accommodated and to which said nozzle is fixed, said injection cylinder being axially slidable with respect to said nozzle, said mounting means including a spring extending around said nozzle and urging said injection cylinder toward an end of said casing distant from said nozzle, and said cylinder having distant from said nozzle an end pressed against said end of said casing distant from said nozzle by said spring for maintaining said injection means at a predetermined position with respect to said casing of said mounting means.

2. The combination of claim 1 and wherein said mounting means includes a bar carrying said casing and normally situated over said bolster means when the latter is in said operative position, a pair of air cylinders carried by said bolster means, and a pair of pistons in said air cylinders and having piston rods connected to said bar for urging the latter away from said bolster means together with said casing and injection means carried thereby, said bar being formed with openings passing therethrough, a pair of bolts fixed to said upper bolster means and extending through said openings of said bar, and a pair of nuts carried by said bolts and engaging the side of said bar opposite from said air cylinders so that the latter urge said bar against said nuts to determine the position of said casing and thus the position of said injection means with respect to said bolster.

3. The combination of claim 2 and wherein a pair of springs surround said bolts between said bar and bolster means for also pressing said bar against said nuts.

* * * * *